(12) United States Patent
Kawamura et al.

(10) Patent No.: US 7,461,224 B2
(45) Date of Patent: Dec. 2, 2008

(54) REMOTE COPY SYSTEM

(75) Inventors: Shunji Kawamura, Yokohama (JP);
Yoshiaki Eguchi, Yokohama (JP);
Takashige Iwamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/582,325

(22) Filed: Oct. 18, 2006

(65) Prior Publication Data
US 2007/0038825 A1   Feb. 15, 2007

Related U.S. Application Data

(63) Continuation of application No. 10/843,379, filed on May 12, 2004, now Pat. No. 7,143,253.

(30) Foreign Application Priority Data
Mar. 12, 2004   (JP) ............................. 2004-070128

(51) Int. Cl.
*G06F 12/16* (2006.01)
(52) U.S. Cl. ....................... 711/162; 707/204
(58) Field of Classification Search ........................ None
See application file for complete search history.

(56) References Cited

U.S. PATENT DOCUMENTS

| | | | |
|---|---|---|---|
| 6,052,797 A | 4/2000 | Ofek et al. ...................... 714/6 |
| 6,408,370 B2 | 6/2002 | Yamamoto et al. .......... 711/167 |
| 6,618,818 B1 | 9/2003 | Wahl et al. ...................... 714/6 |
| 6,745,303 B2 | 6/2004 | Watanabe | |
| 6,760,824 B2 | 7/2004 | Urabe et al. ................. 711/162 |
| 6,859,865 B2 | 2/2005 | De Margerie et al. ....... 711/162 |
| 2004/0024975 A1* | 2/2004 | Morishita et al. ........... 711/147 |
| 2004/0172509 A1 | 9/2004 | Takeda et al. | |
| 2004/0267829 A1 | 12/2004 | Hirakawa et al. | |
| 2005/0033827 A1 | 2/2005 | Yamagami | |

(Continued)

OTHER PUBLICATIONS

NetApp.NOW(NetApp On the Web), First Alert #200: Network Appliance Announces Data ONTAP Release 6.5, pp. 1-3, Jan. 13, 2004.

*Primary Examiner*—Gary J Portka
(74) *Attorney, Agent, or Firm*—Mattingly, Stanger, Malur & Brundidge, P.C.

(57) ABSTRACT

In asynchronous remote copy, there is time difference between data update and remote copy in a primary storage system. The primary storage system loses data unreflected on a secondary storage system in disaster and cannot control the amount of data lost. The primary storage system obtains the data reflection state of remote copy between it and the secondary storage system to manage the amount of data update delay between the storage systems. When the amount of delay meets a configured start condition, a process of reducing the amount of delay is started. When the amount of delay meets a separately configured stop condition, the process of reducing the amount of delay is stopped. The configuration of whether the process of reducing the amount of delay is performed and the configuration of the conditions are performed from outside.

19 Claims, 12 Drawing Sheets

U.S. PATENT DOCUMENTS

| | | |
|---|---|---|
| 2005/0033828 A1 | 2/2005 | Watanabe |
| 2005/0038968 A1 | 2/2005 | Iwamura et al. |
| 2005/0055523 A1 | 3/2005 | Suishu et al. |
| 2005/0114467 A1 | 5/2005 | Ikegaya et al. |
| 2005/0125426 A1 | 6/2005 | Minematsu |
| 2005/0125465 A1 | 6/2005 | Arakawa et al. |
| 2005/0125617 A1 | 6/2005 | Ninose et al. |
| 2005/0132155 A1 | 6/2005 | Kasako |
| 2005/0144380 A1 | 6/2005 | Suzuki et al. |
| 2005/0172166 A1 | 8/2005 | Eguchi et al. |

* cited by examiner

FIG. 4

| | | |
|---|---|---|
| 410 — CONSISTENCY GROUP ID | | |
| 420 — LATEST SEQUENCE NUMBER | | |
| 430 — FORMALIZED SEQUENCE NUMBER | | |
| 440 — PAIR STATE | | |
| 450 — VOLUME INFORMATION | VOLUME 1 | VOLUME MANAGEMENT INFORMATION — 300 |
| | VOLUME 2 | ... |
| | ... | |
| 460 — INFORMATION ON THE AMOUNT OF DELAY | TIME DIFFERENCE | 461 |
| | NUMBER OF UPDATES | 462 |
| | THE AMOUNT OF UPDATE DATA | 463 |
| 470 — FLAG IN WHICH PROCESS OF REDUCING THE AMOUNT OF DELAY IS BEING PERFORMED | | |

REMOTE COPY SYSTEM

The present application is a continuation of application Ser. No. 10/843,379, filed May 12, 2004, now U.S. Pat. No. 7,143, 253, which claims priority from Japanese application No. 2004-070128, filed on Mar. 12, 2004, the contents of which are hereby incorporated by reference.

BACKGROUND OF THE INVENTION

The present invention relates to a remote copy technique duplicating data stored in a storage system to another storage system.

As a technique preventing data loss in a storage system due to disaster, there is a technique duplicating data to a storage system at a remote site (remote copy). Here, the storage system includes a storage device such as a disk and a storage controller coupled to the storage device for controlling input and output of data to/from the storage device. The remote copy is a technique in which a storage system at a primary site (hereinafter, also called a primary storage system) transfers data in the source storage system to another storage system (hereinafter, also called a secondary storage system) at a remote site (hereinafter, also called a secondary site), and the target storage system stores the data received from the source storage system in a storage device in the target storage system. As for the remote copy, disclosed is a technique duplicating data not via a host computer (hereinafter, called a host) between different storage controllers (see Patent Document 1).

Here, Patent Document 1 refers to U.S. Pat. No. 6,408,370.

SUMMARY OF THE INVENTION

In the above prior art, the primary storage system transfers write data to the secondary storage system asynchronous to a write request from the host computer. The primary storage system in disaster loses data untransferred to the secondary storage system. The difference in the amount of written data (the amount of update data) or the difference (deviation) in write timing between the primary storage system and the secondary storage system is called the amount of delay of asynchronous remote copy. When the amount of delay is larger, the amount of data of the primary storage system lost in disaster is increased. When attempting to reduce the amount of delay, the system configuration is larger and the performance to the host computer is decreased. In the asynchronous remote copy, the amount of delay of the asynchronous remote copy must be controlled according to the request level of the user.

To solve the above problems, a computer system has: a primary site having a host computer and a first storage system coupled to the host computer; and a secondary site having a second storage system, wherein the first storage system is coupled to the second storage system via a communication line, wherein the first storage system, when receiving a write request from the host computer, transfers write data transferred according to the write request to the second storage system via the communication line. The second storage system writes the write data transferred from the first storage system into a second storage area owned by the second storage system. The first storage system obtains, from the second storage system, information indicating that the second storage system has written the write data into the second storage area to have the amount of delay of data write between the first storage system and the second storage system.

The amount of delay may be any one of time difference in data write, the difference in the number of data writes, and the difference in the amount of data of data write between the first storage system and the second storage system.

A process of reducing the amount of delay is operated when the amount of delay exceeds a predetermined threshold value.

The operation reducing the amount of delay may be any one of an operation delaying a write completion report of remote copy, an operation increasing the priority of asynchronous remote copy, and an operation increasing the number of paths of asynchronous remote copy.

The amount of delay may be managed by the host computer.

Consequently, the amount of delay of asynchronous remote copy between the primary storage system and the secondary storage system can be reduced as necessary, and the amount of data of the primary storage system lost in disaster can be within a configuration value.

BRIEF DESCRIPTION OF THE DRAWINGS

FIG. 4 is a diagram showing an example of consistency group management information;

DESCRIPTION OF THE PREFERRED EMBODIMENTS

Embodiment 1

Embodiments of the present invention will be described below using FIGS. 1 to 13.

A first embodiment of the present invention will be described using FIGS. 1 to 12.

(I) The Configuration of a Computer System

The configuration of a computer system according to the first embodiment of the present invention will be described using FIG. 1.

Figure 1:
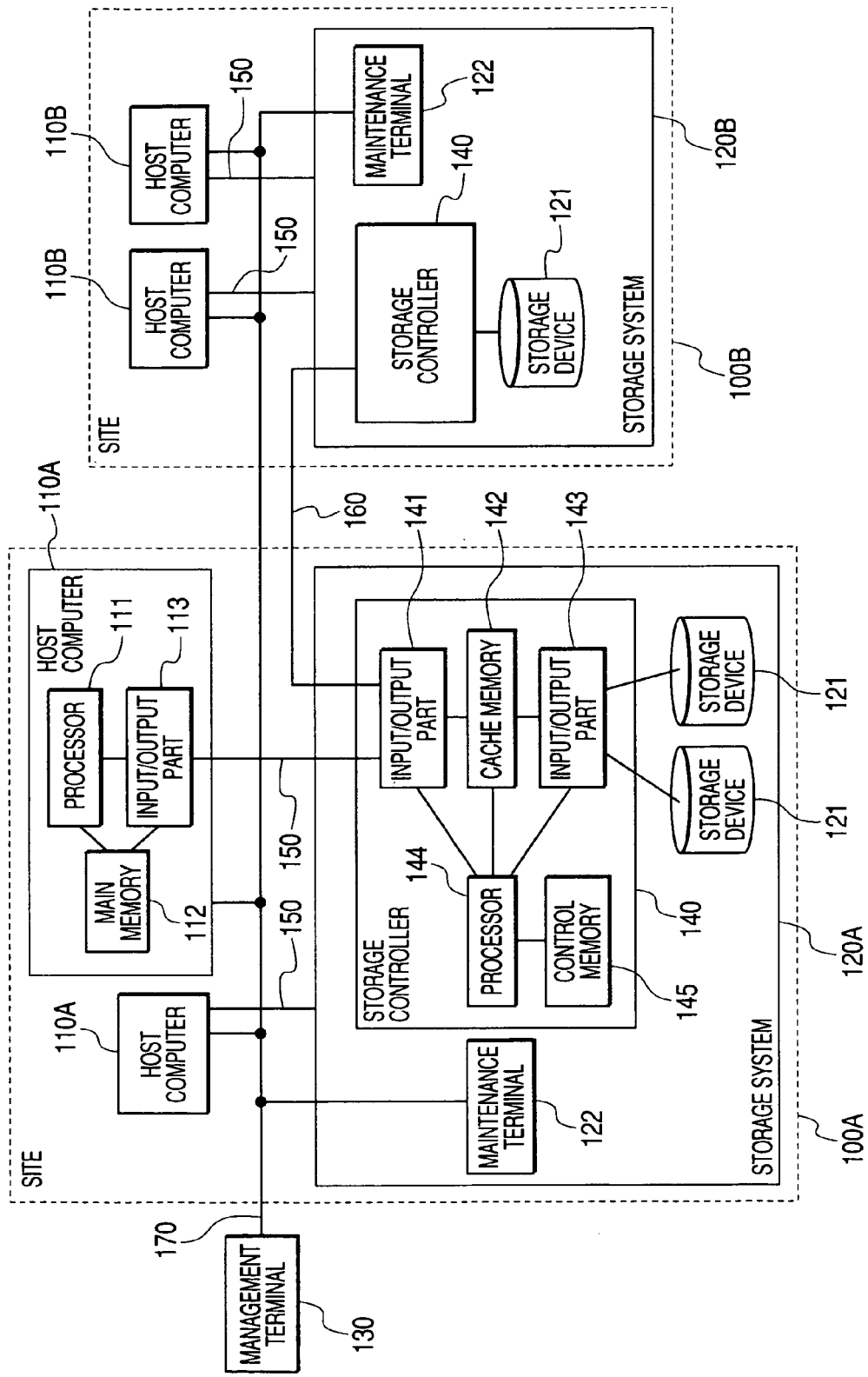
FIG. 1 is a diagram showing a hardware configuration example of a computer system according to a first embodiment of the present invention.

FIG. 1 is a diagram showing the hardware configuration of the computer system according to the first embodiment of the present invention.

Figure 2:
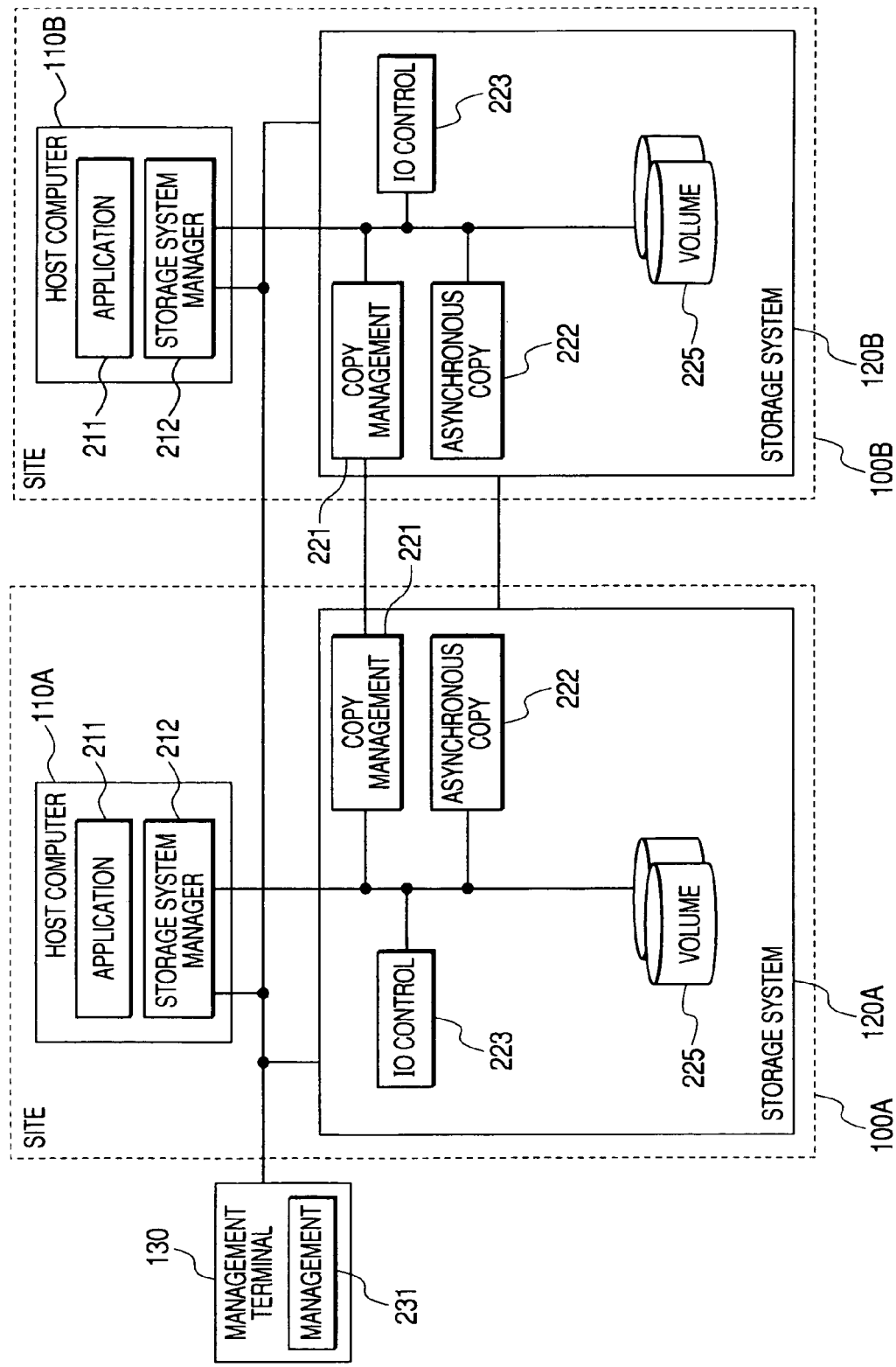
FIG. 2 is a diagram showing an example of the logic configuration of the computer system according to the first embodiment.

FIG. 2 is a diagram showing the functional configuration of the computer system according to the first embodiment of the present invention.

In the computer system of this embodiment, sites conjunctly perform processes and each of the sites has a host computer and s storage system.

Here, a first site is called a "primary site", a second site is called a "secondary site", and an example performing remote copy from the primary site to the secondary site will be described. A host computer belonging to the primary site is called a "primary host computer", and a storage device belonging to the primary site is called a "primary storage system". The secondary site is alike.

As shown in FIG. 1, a primary site 100A has a primary host computer 110A and a primary storage system 120A, a secondary site 100B has a secondary host computer 110B and a secondary storage system 120B, and a management terminal 130 is coupled to them.

The primary site 100A and the secondary site 100B may have a plurality of primary host computers 110A and a plurality of secondary host computers 110B, respectively.

Each of the host computers 110 (the primary host computer 110A and the secondary host computer 110B) is a computer having a processor 111, a main memory 112, and an input/output processing unit 113. Specifically, it is a work station, microcomputer, or a mainframe computer.

Each of the storage systems 120 has a storage controller 140, one or more storage devices 121, and a maintenance terminal 122. The storage device 121 is an auxiliary storage device such as a magnetic disk storage device or an optical disk storage device. The storage system 120 may not have the maintenance terminal 122. The storage controller 140 has a host computer input/output processing unit 141, a cache memory 142, a disk input/output processing unit 143, a processor 144, and a control memory 145.

The host computer is coupled to the storage system via a host computer-storage system network 150 such as a LAN (Local Area Network) or SAN (Storage Area Network). The processor 111 and the main memory 112 of each of the host computers are coupled to the host computer input/output processing unit 141 of the storage system 120 via the input/output processing unit 113 and the host computer-storage system network 150.

The storage systems are coupled via a storage system network 160. In general, the storage system network 160 is often a global network such as a public line and is often rented for pay from a communication service provider. For the safety of the system, in order to keep away from each other (in order that both sites cannot suffer failure at the same time), the global network is often used. When the storage systems are in the same room, in the same building, or in buildings adjacent to each other, a local network may be used. Such network form does not limit the present invention.

The management terminal 130 is also a computer having a processor and a main memory. The management terminal 130, the primary host computer 110A, the secondary host computer 110B, the primary storage system 120A, and the secondary storage system 120B are mutually coupled via a network 170 such as a LAN or WAN.

The functional configuration of such computer system is as shown in FIG. 2.

In each of the storage controllers 140, a copy management program 221 as a program controlling data transfer between the storage systems 120, an asynchronous copy program 222, and an IO control program 223 controlling an input/output request from the host computer based on an instruction from the copy management program are executed on the processor 144. These programs are stored in the control memory 145.

The copy management program 221 manages an asynchronous remote copy process executed by each of the storage systems. The detail thereof will be described later. During the asynchronous remote copy process, communication is performed at all times between the copy management programs 221 of the storage controllers 140 to exchange necessary management information. The IO control program 223 executes an input/output process to the storage device 121 based on an instruction from each of the host computers.

The storage controller 140 executes an input/output process to the storage device 121 based on an instruction from each of the host computers in addition to the processes of the copy management program 221, the asynchronous copy program 222, and the IO control program 223.

One or more logical storage areas (volumes) are created in or related with the storage device 121. In each of the host computers 110, the application program 211 used by the user and the program (hereinafter, called a "storage system manager") 212 as a storage system control interface are executed on the processor 111 owned by the host computer 110. The copy management program and the storage system manager 212 send or receive information to/from each other. The management terminal 130 executes a management program 231. The management terminal 130 executes the management program 231 to manage the components of the computer system of this embodiment, specifically, the host computers 110 and the storage systems 120. The program 231 is stored in the main memory of the management terminal 130.

The programs described here are installed on a recording medium owned by each of the devices using a portable medium such as a compact disc or an optical magnetic disc or via the network 170.

(II) Data Structure Used in the Computer System

A data structure used in the computer system of this embodiment will be described using FIGS. 3 to 6.

Figure 3:
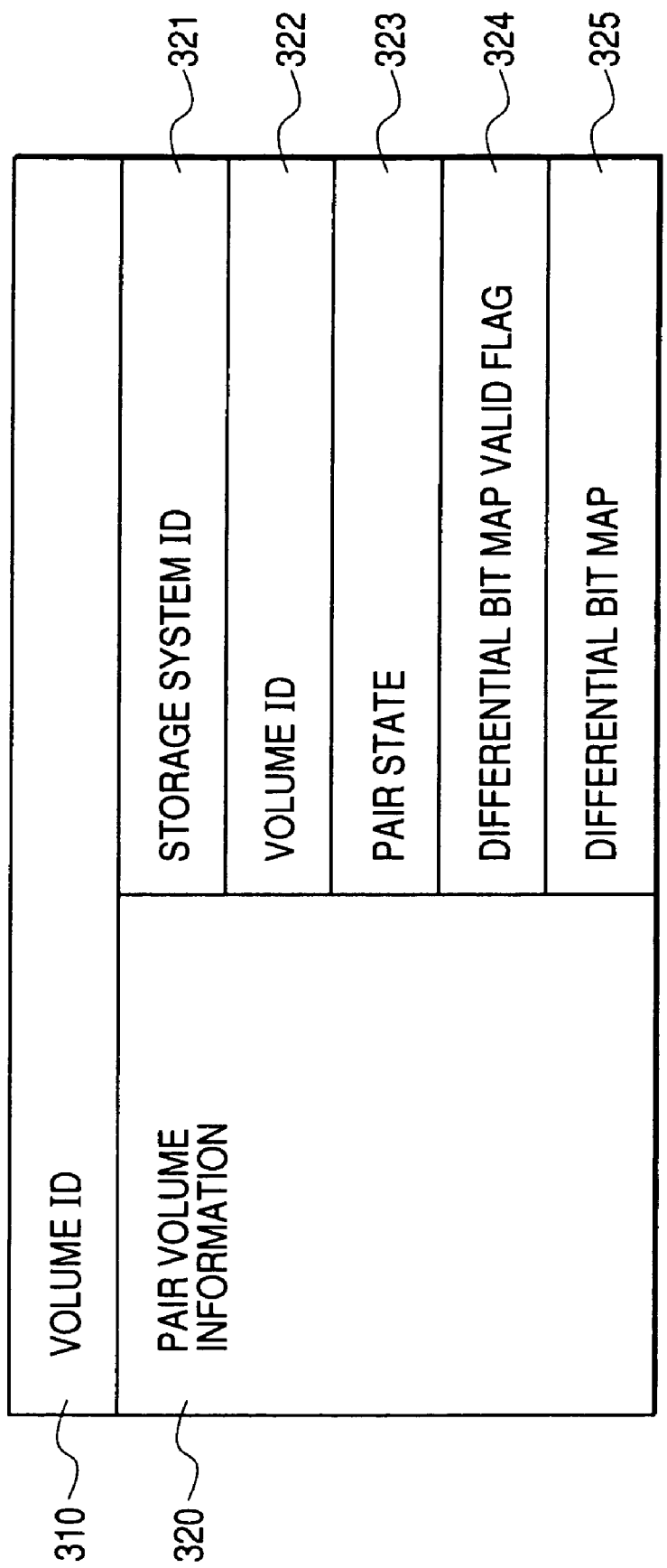
FIG. 3 is a diagram showing an example of volume management information.

FIG. 3 is a diagram showing volume management information.

FIG. 4 is a diagram showing consistency group management information.

Figure 5:
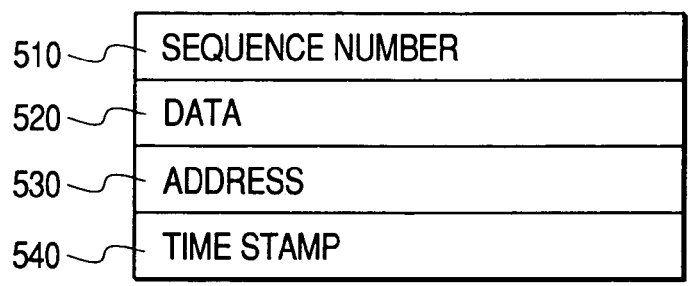
FIG. 5 is a diagram showing an example of asynchronous remote copy write data information.

FIG. 5 is a diagram showing asynchronous remote copy data information.

Figure 6:
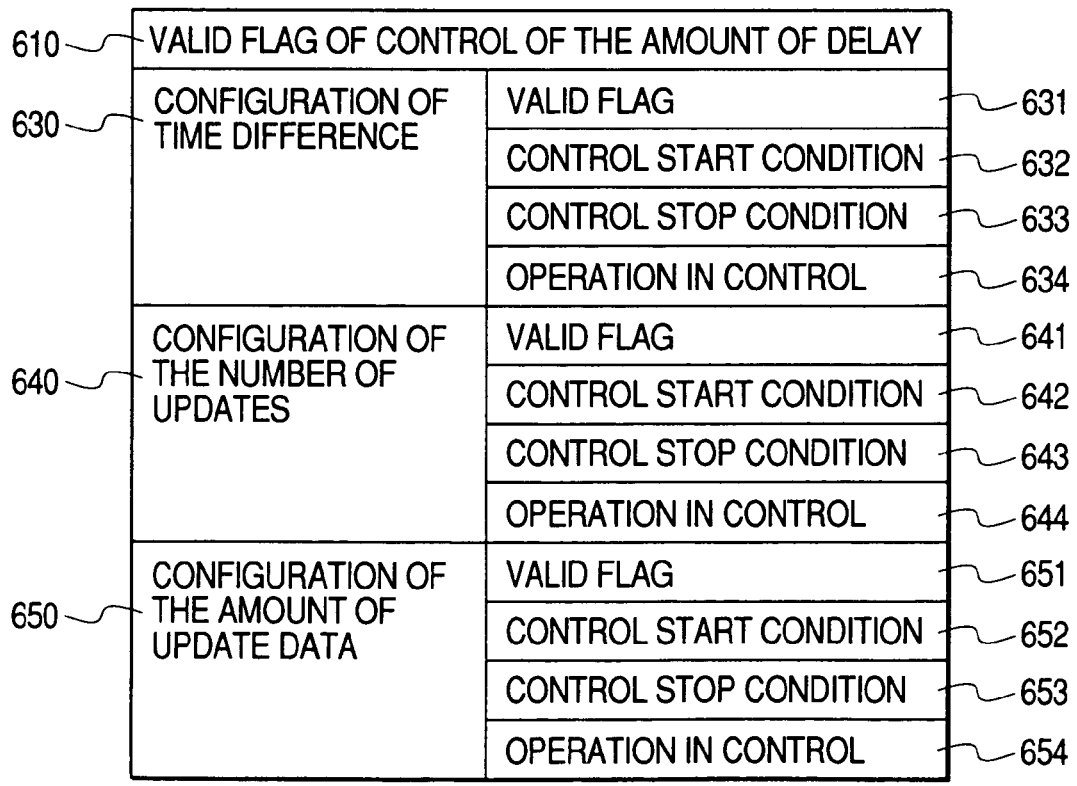
FIG. 6 is a diagram showing an example of configuration information on control of the amount of delay of asynchronous remote copy.

FIG. 6 is a diagram showing configuration information on control of the amount of delay of asynchronous remote copy.

The volume management information will be described using FIG. 3.

Volume management information 300 is information managing a remote copy pair and is information owned by each remote copy pair volume, which is stored in the control memory 145 of each of the storage systems 120.

The volume management information 300 includes a volume ID 310 for identifying a volume in the storage system, and pair volume information 320 as information on a data volume as a remote copy pair.

The pair volume information 320 includes a storage system ID 321, a volume ID 322 identifying a pair volume, a pair state 323 showing a duplication state, a differential bit map valid flag 324, and a differential bit map 325.

The storage system ID 321 is an identifier of the storage system in which a pair volume exists, and the volume ID 322 is a volume identifier in the storage system. The storage system ID 321 is combined with the volume ID 322 to uniquely decide a pair volume.

The pair state 323 refers to any one of the states of "PAIR" in which a data volume is in a state of duplication (in a state that there is data consistency in the volume), "COPY" in which differential copy is being performed, and "SUSPEND" in a state of suspend in which a copy process is stopped by blockage of a volume or path. The differential bit map valid flag 324 indicates whether a value of the differential bit map is valid. The differential bit map 325 is information indicating an area in which data of PVOL and SVOL are different. A volume area is divided into a plurality of areas, and when the data volume is updated during the SUSPEND, the bit indicating the updated area is allowed to be ON. After the SUSPEND, only the area in which the bit is ON is copied (differential copied) based on the bit map by carrying out OR of the differential bit map 325 of each of the PVOL and SVOL to return the pair to the duplication state. The differential copy can reduce the amount of copy transfer. In the differential copy, the bit is allowed to be OFF in the copied area, and when all bits are OFF, the differential copy is completed. All bits of the differential bit map are allowed to be ON at pair create to perform the differential copy (initial copy) to copy all areas of the PVOL to the SVOL.

Consistency group management information will be described using FIG. 4.

The consistency group management information is information for managing a consistency group and is stored in the control memory 145 of each of the storage systems 120.

The consistency group management information includes a consistency group ID 410, the latest sequence number 420, a formalized sequence number 430, a pair state 440, volume information 450, and delay information 460.

Here, the consistency group refers to a plurality of remote copy pairs related with each other. A write request from the host computer to the primary volume in the consistency group maintains the write request order in the consistency group to be copied to the secondary volume as the remote copy pair of the primary volume. To maintain the write order, a serial number (sequence number 510) is given to each remote copy write data.

The secondary storage system can reflect the remote copy write data whose sequence numbers are complete and cannot reflect the remote copy write data with any lacked lower sequence number. A process of deciding that the remote copy write data can be reflected in the secondary storage system is called formalization.

The consistency group ID 410 is an identifier uniquely deciding the consistency group.

The latest sequence number 420 is a number given latest of the sequence numbers given to the asynchronous remote copy write data of the consistency group.

The formalized sequence number 430 is the sequence number of the remote copy write data which has been formalized in the secondary storage system.

The pair state 440 refers to any one of the states of "PAIR" in which all pairs in the consistency group is in a state of duplication, "COPY" in which one or more pairs in the consistency group are being differential copied, "SUSPEND" in which all pairs in the consistency group are in a state of suspend (in a state that there is data consistency in the consistency group), and "SUSPEND-E" in which some pairs in the consistency group are in a state of suspend (in a state that there is no data consistency in the consistency group).

The volume information 450 includes the volume management information 300 of each of the pairs included in the consistency group.

The delay information 460 is information expressing the difference in write update of remote copy between the primary storage system and the secondary storage system.

The primary storage system remote copies write data to the secondary storage system asynchronous to a write request from the host computer. Therefore, there can be some write data which has been written into the pair volume of the primary storage system, and has not been remote copied and reflected in the secondary storage system. The delay of reflection in the secondary storage system is called delay of asynchronous remote copy.

The information on the amount of delay 460 includes delay time difference 461, the number of delay updates (writes) 462, and the amount of delay update (write) data 463.

The delay time difference 461 indicates the difference between time at which the remote copy write data reflected in the secondary storage system is updated by the primary storage system and the current time.

The number of delay updates (writes) 462 indicates the number of write requests from the host computer received by the primary storage system after the point of time at which the remote copy write data reflected by the secondary storage system is updated by the primary storage system.

The amount of delay update (write) data 463 indicates the sum of the amount of write data of the write request from the host computer received by the primary storage system after the point of time at which the remote copy write data reflected by the secondary storage system is updated by the primary storage system.

The asynchronous remote copy data information will be described using FIG. 5.

The asynchronous remote copy data information is data transferred from the primary storage system to the secondary storage system.

The asynchronous remote copy data information includes a sequence number 510, data 520, an address 530, and time stamp 540.

The sequence number 510 is a serial number given to maintain the write order in the consistency group, as described above.

The data 520 is a copy of data written into the primary volume. The secondary volume is write updated as in the primary volume.

The address 530 indicates a location for writing write data in the secondary storage system.

The time stamp 540 indicates time at which the primary storage system receives a write request.

The configuration information on control of the amount of delay of asynchronous remote copy will be described using FIG. 6.

The configuration information on control of the amount of delay is configuration information for operation so as to reduce the amount of delay when the amount of delay of asynchronous remote copy is increased, in order to prevent the amount of data loss of the primary site in disaster from being increased. The configuration information on control of the amount of delay is owned by each of consistency groups and is stored in the control memory 145 of each of the storage systems 120.

The configuration information on control of the amount of delay includes a valid flag of control of the amount of delay 610, configuration information on time difference 630, configuration information on the number of updates (writes) 640, and configuration information on the amount of update (write) data 650. The valid flag of control of the amount of delay indicates whether a process of reducing the amount of delay is operated to the consistency group when the amount of delay of asynchronous remote copy is increased. The configuration information on time difference 630 includes a valid flag 631, a control start threshold value 632, a control stop threshold value 633, and operation in control 634. The valid flag 631 indicates whether control is performed so as to reduce the amount of delay (hereinafter, called a process of reducing the amount of delay) when the delay time difference is increased. The control start condition 632 is a condition starting the process of reducing the amount of delay. Specifically, it is the threshold value of the delay time difference starting control. The control stop condition 633 is a condition stopping the process of reducing the amount of delay which is being executed. Specifically, it is the threshold value of the delay time difference when stopping the process, which is a value smaller than that of the above start condition. The operation in control 634 indicates how the process of reducing the amount of delay is performed. As a specific process of reducing the amount of delay, for example, a response the storage system at the primary site sends to the host computer may be delayed to a write request from the host computer to the primary volume of the consistency group. The response is delayed to limit input of the write request from the host computer to the storage system at the primary site. Since the asynchronous remote copy is continued, the amount of delay is gradually reduced. As another process of reducing the amount of delay, the priority of the remote copy process of the consistency group may be increased. Increase in the priority of the remote copy frequently performs transfer, and the amount of delay is gradually reduced. As a further process of reducing the amount of delay, the number of transfer lines of the remote copy may be increased. Increase in the number of paths enhances the transfer ability of the remote copy, and the amount of delay is gradually reduced. The operation in reduction 634 includes one or more operations of the processes of reducing the amount of delay.

The configuration information on the number of updates 640 and the configuration information on the amount of update data 650 also include valid flags 641, 651, control start conditions 642, 652, control stop conditions 643, 653, and operation in control 644, 654, respectively.

(III) Processes of the Computer System

Processes of the computer system according to the first embodiment of the present invention will be described using FIGS. 7 and 12.

(III-1) Process of Creating a Remote Copy Pair

A process of creating a remote copy pair according to the first embodiment of the present invention will be described using FIG. 7.

Figure 7:
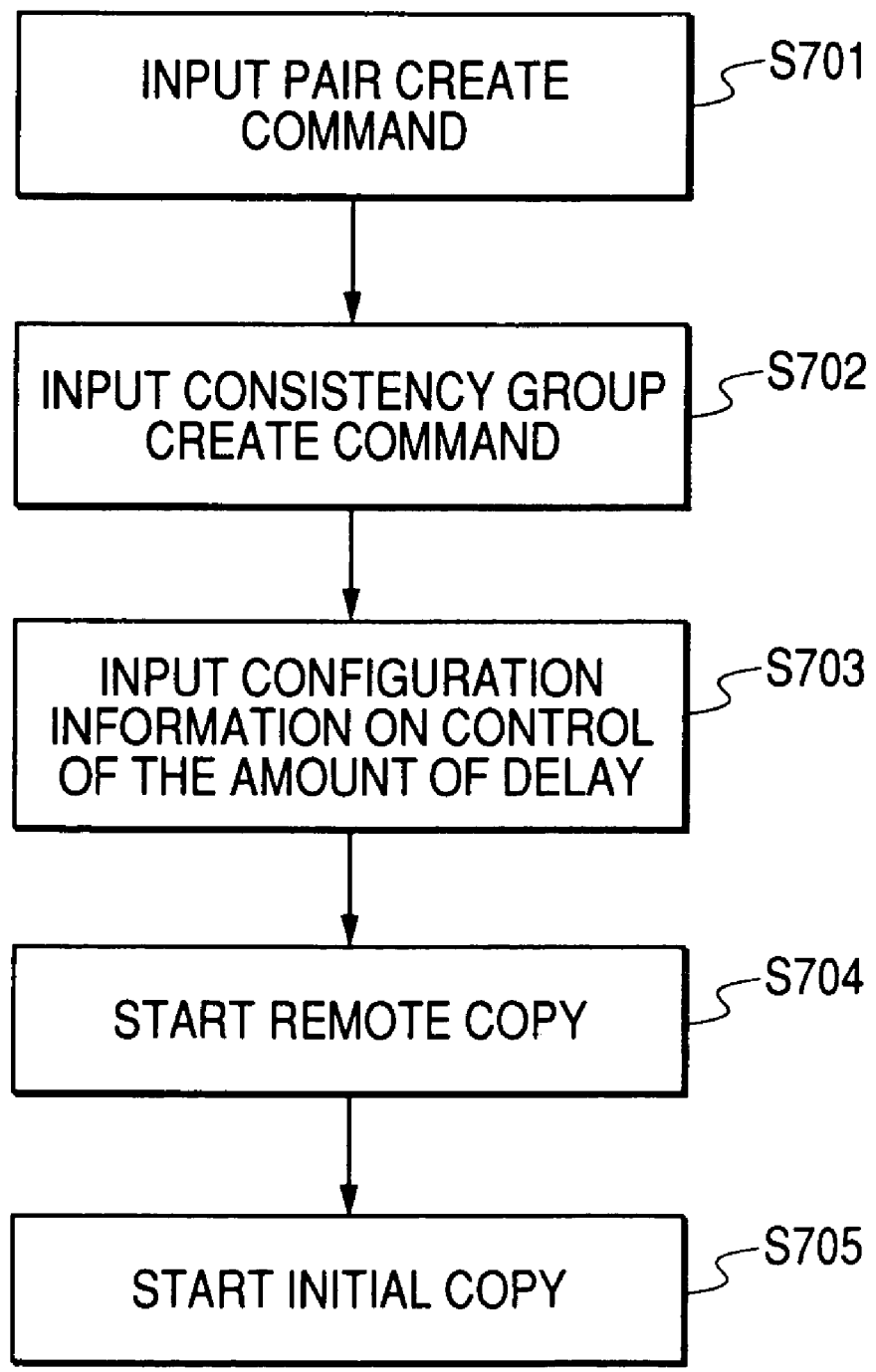
FIG. 7 is a diagram showing an example of a pair create process of asynchronous remote copy.

FIG. 7 is a flowchart showing the process of creating a remote copy pair of the computer system according to the first embodiment.

The user inputs a pair create command to the storage system using GUI (Graphical User Interface) owned by the host computer 110, the management terminal 130 or the maintenance terminal 122 (S701). The pair create command is a command relating a primary volume (hereinafter, called "PVOL") 825 owned by the primary storage system 120A as a source of remote copy with a secondary volume (hereinafter, called "SVOL") 826 owned by the secondary storage system 120B as a target of the remote copy stored in the PVOL. This process may be performed to a plurality of volumes. The user inputs a command relating, as a consistency group, a plurality of pairs of the remote copy related with each other in S701 (S702). A plurality of consistency groups may be created.

The user inputs the configuration information on control of the amount of delay to the consistency group created in S702 of the input of the pair create command (S703). The information itself described in FIG. 6 may be directly inputted. For example, the user inputs the upper limit value of the amount of delay, and the storage system may convert it to the control start threshold values 632, 642, 652 and the control stop threshold values 633, 643, 653 so that the amount of delay is within the upper limit value.

After creating the consistency group, the configuration information on control of the amount of delay may be inputted after remote copy is started. A once inputted value may be re-inputted to change it.

After the consistency group has been created, remote copy is executed (S704). The process of reducing the amount of delay is performed according to the state during execution of the remote copy. The detail of the decision process of the process of reducing the amount of delay will be described later.

Data stored in the PVOL 825 before starting the remote copy are not transferred to the secondary storage system after the remote copy is started. Separately, the data (hereinafter, called "initial data") must be copied from the PVOL 825 to the SVOL 826. In this embodiment, an initial copy process of transferring the initial data from the PVOL 825 to the SVOL 826 is executed (S705). The initial data from the volume head area to the volume last area of the PVOL 825 are transferred.

(III-2) Overview of a Process of Controlling the Amount of Delay

A process of controlling the amount of delay of asynchronous remote copy will be described using FIG. 8.

Figure 8:
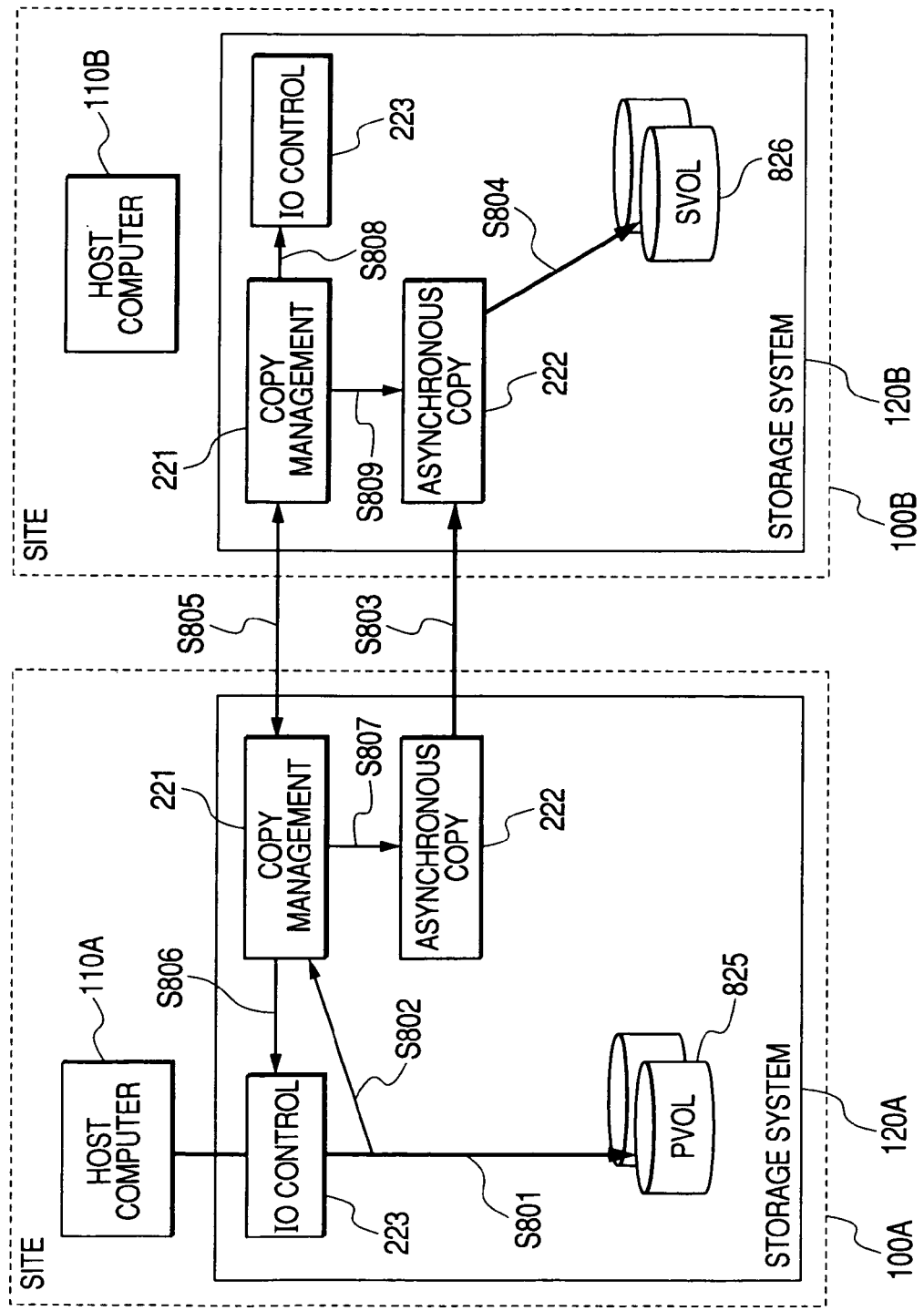
FIG. 8 is a diagram showing an example of the operation of a process of controlling the amount of delay of asynchronous remote copy according to the first embodiment.

FIG. 8 is a diagram showing the operation of the process of controlling the amount of delay of asynchronous remote copy according to the first embodiment of the present invention.

The storage systems 120A and 120B respectively execute the copy management program 221 to control the remote copy process. The primary storage system 120A updates the amount of delay of asynchronous remote copy (S802) according to a write process (S801) from the primary host computer 110A to the PVOL 825. The detail of the process of updating the amount of delay (S802) will be described later. The primary storage system 120A returns a write completion response to the primary host computer 110A.

The primary storage system 120A executes the asynchronous copy program 222 to transfer a copy of data written into the PVOL 825 to the secondary storage system 120B (S803). At this time, the primary storage system 120A may give a write request to the secondary storage system 120B to realize data transfer, or the secondary storage system 120B may give a read request to the primary storage system 120A to realize data transfer.

The secondary storage system 120B executes the asynchronous copy program 222 to write into the SVOL 826 the transferred remote copy write data whose sequence numbers are complete (S804). Here, without directly writing the transferred remote copy write data into the SVOL 826, this may be realized by a method of writing the transferred remote copy write data into another volume to reflect the data to the SVOL 826.

The copy management program 221 of the primary storage system 120A and the copy management program 221 of the secondary storage system 120B exchange information on the copy state of the remote copy (S805). Specifically, the information exchanged is the latest sequence number of the remote copy write data which has been formalized by the secondary storage system 120B.

The copy management program 221 of the primary storage system 120A updates the amount of delay of asynchronous remote copy from the information on the copy state of the remote copy received from the secondary storage system 120B. When the amount of delay of asynchronous remote copy meets the configuration condition, the process of reducing the amount of delay is started. The detail of the process of updating the amount of delay and the decision process of the process of reducing the amount of delay will be described later.

As the process of reducing the amount of delay, the copy management program of the primary storage system 120A gives an instruction to the IO control program 223 to delay a write request response from the primary host computer 110A (S806), and gives an instruction to the asynchronous copy program to increase the priority of remote copy (S807), and the copy management program 221 of the primary storage system 120A gives an instruction via the copy management program 221 of the secondary storage system 120B to delay a response to an input/output request from the secondary host computer 110B (S808), thereby reducing the load of the secondary storage system, increasing the priority of the process of formalizing the remote copy write data by the asynchronous copy program (S809), and increasing the number of transfer lines of the remote copy.

(III-3) Process of Updating the Amount of Delay of Asynchronous Remote Copy

A process of updating the amount of delay of asynchronous remote copy will be described using FIGS. 9 and 10.

Figure 9:
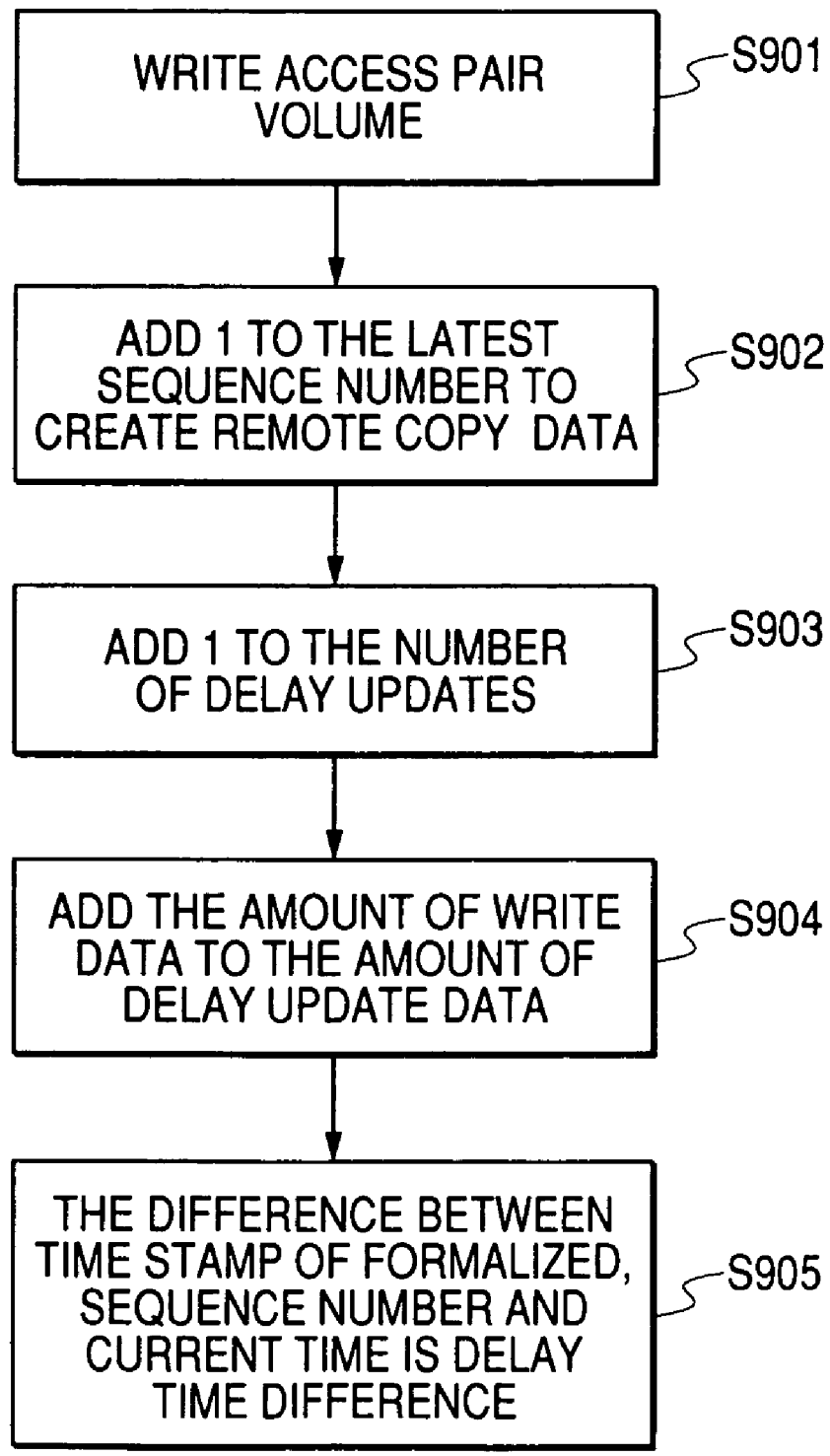
FIG. 9 is a diagram showing an example of a process of updating the amount of delay of asynchronous remote copy at write request.

FIG. 9 is a flowchart showing the process of updating the amount of delay of asynchronous remote copy at a write request.

When the primary storage system 120A receives from the primary host computer 110A a write request in the PVOL 825 as a remote copy pair (S901), the primary storage system 120A creates remote copy data (S902). To the sequence number of the remote copy data, there is given a value obtained by adding 1 to the latest sequence number 420 of the consistency group including the PVOL 825. Time at which the write request is received is given as time stamp.

Adding 1 to the number of delay updates of the consistency group including the PVOL 825 (S903), the data size of the write request is added to the amount of delay update data 363 (S904). The difference between the time stamp given to the remote copy data of the formalized sequence number 430 owned by the primary storage system 120A and the current time is the delay time difference 461 (S905).

Figure 10:
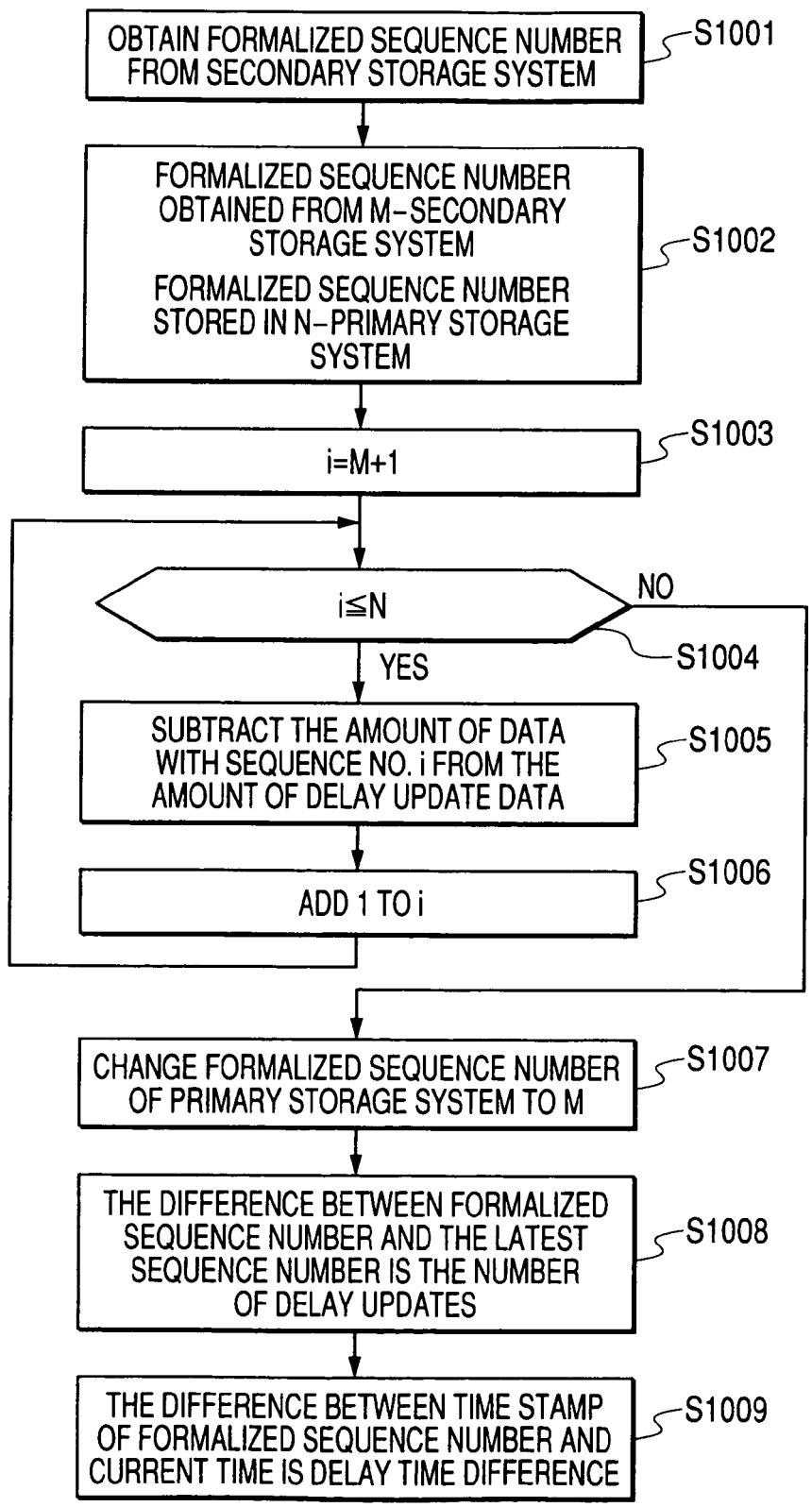
FIG. 10 is a diagram showing an example of a process of updating the amount of delay of asynchronous remote copy.

FIG. 10 is a flowchart showing the process of updating the amount of delay of asynchronous remote copy when the copy management programs 221 of the storage systems 120 exchange the copy state of remote copy.

The copy management program 221 of the primary storage system 120A obtains, from the copy management program 221 of the secondary storage system 120B, the latest number of the sequence numbers of the remote copy data which have been formalized in the secondary storage system 120B (S1001).

The past formalized sequence number 430 stored in the primary storage system 120A is N, and the formalized sequence number obtained from the secondary storage system 120B is M (S1002).

The sum of the amount of data of the remote copy data given the sequence numbers from M+1 to N is subtracted from the amount of delay update data 463 owned by the primary storage system 120A (S1003, S1004, S1005, and S1006). The formalized sequence number 430 owned by the primary storage system 120A is changed to M (S1007).

The difference between the latest sequence number 420 owned by the primary storage system 120A and the changed formalized sequence number 430 is the number of delay updates 462 (S1008).

The difference between the time stamp given to the remote copy data of the changed formalized sequence number 430 owned by the primary storage system 120A and the current time is the delay time difference 461 (S1009).

Figure 11:
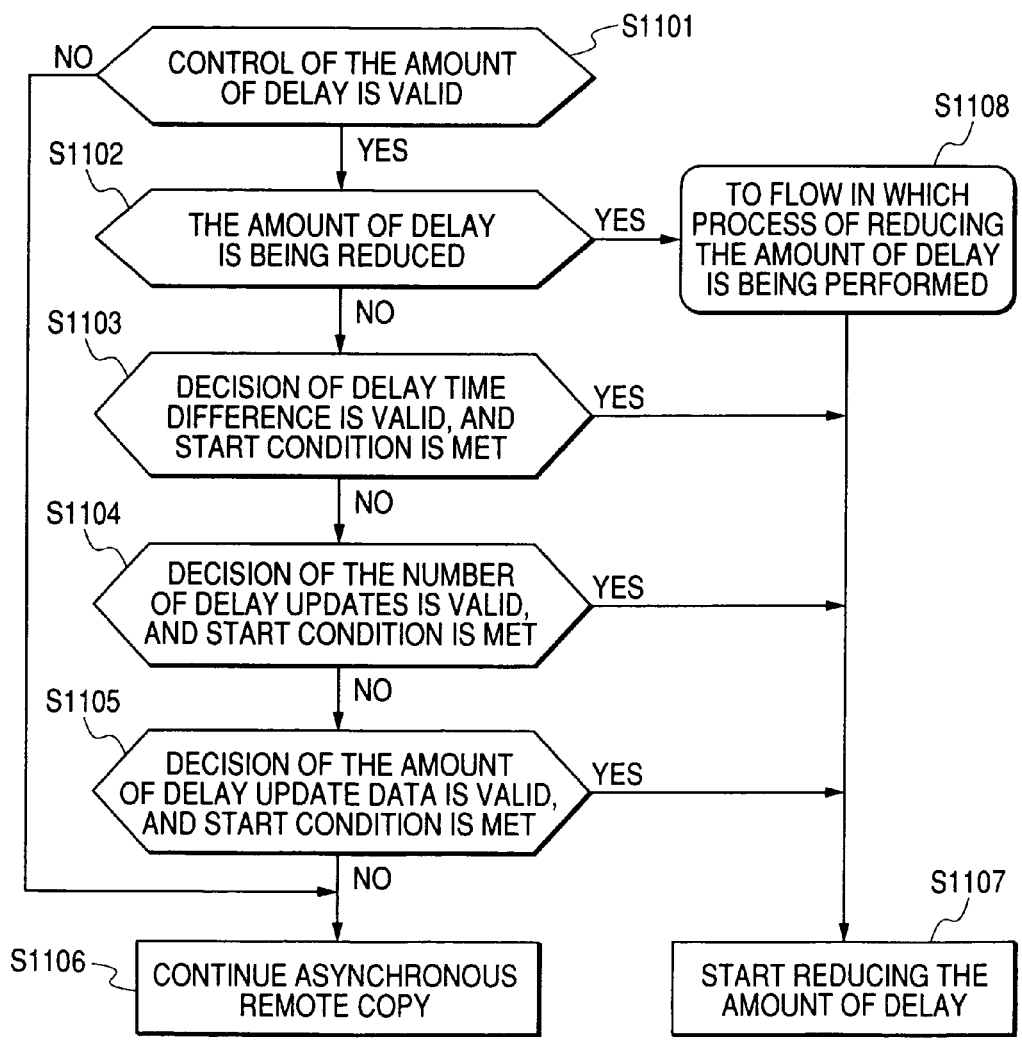
FIG. 11 is a diagram showing an example of a start decision process of a process of reducing the amount of delay.

(III-4) Process of Deciding Control of the Amount of Delay of Asynchronous Remote Copy A process of deciding control of the amount of delay of asynchronous remote copy will be described using FIGS. 11 and 12.

The start decision process of the process of reducing the amount of delay of asynchronous remote copy will be described using FIG. 11. FIG. 11 is a flowchart showing the start decision process of the process of reducing the amount of delay.

The primary storage system 120A performs the process of deciding control of the amount of delay of asynchronous remote copy independently of the write request from the primary host computer 110A and the copy state information exchange of remote copy with the secondary storage system 120B. The process of deciding control of the amount of delay may be performed in synchronization with the write request and the copy state information exchange of remote copy.

The copy management program 221 of the primary storage system 120A checks the valid flag of control of the amount of delay 610 to decide whether it is targeted for control of the amount of delay (S1101). When it is not targeted for control of the amount of delay, the remote copy is continued (S1106). When it is targeted for control of the amount of delay, a flag 470 in which the amount of delay is being controlled is checked to decide whether the process of reducing the amount of delay is being currently performed (S1102). When the process of reducing the amount of delay is being performed, the routine is moved to the process in which the amount of delay is being reduced (S1108).

When the process of reducing the amount of delay is not performed, whether control of the amount of delay by the delay time difference is valid is decided by the valid flag 631. Whether it is valid and the current delay time difference 461 meets the control start condition 632 is decided (S1103). When it meets the condition, the process of reducing the amount of delay is started based on the operation in control of the amount of delay 634 (S1107).

When the process of reducing the amount of delay is not started by the delay time difference, the start decision of the process of reducing the amount of delay for the number of delay updates and the amount of delay update data is performed in the same manner (S1104 and S1105). When they meet the condition, the process of reducing the amount of delay is started based on the operation in control of the amount of delay 644, 654 (S1107).

When not meeting any of the start conditions of the process of reducing the amount of delay for the delay time difference, the number of delay updates and the amount of delay update data, the remote copy is continued (S1106).

The stop decision process of the process of reducing the amount of delay of asynchronous remote copy will be described using FIG. 12.

Figure 12:
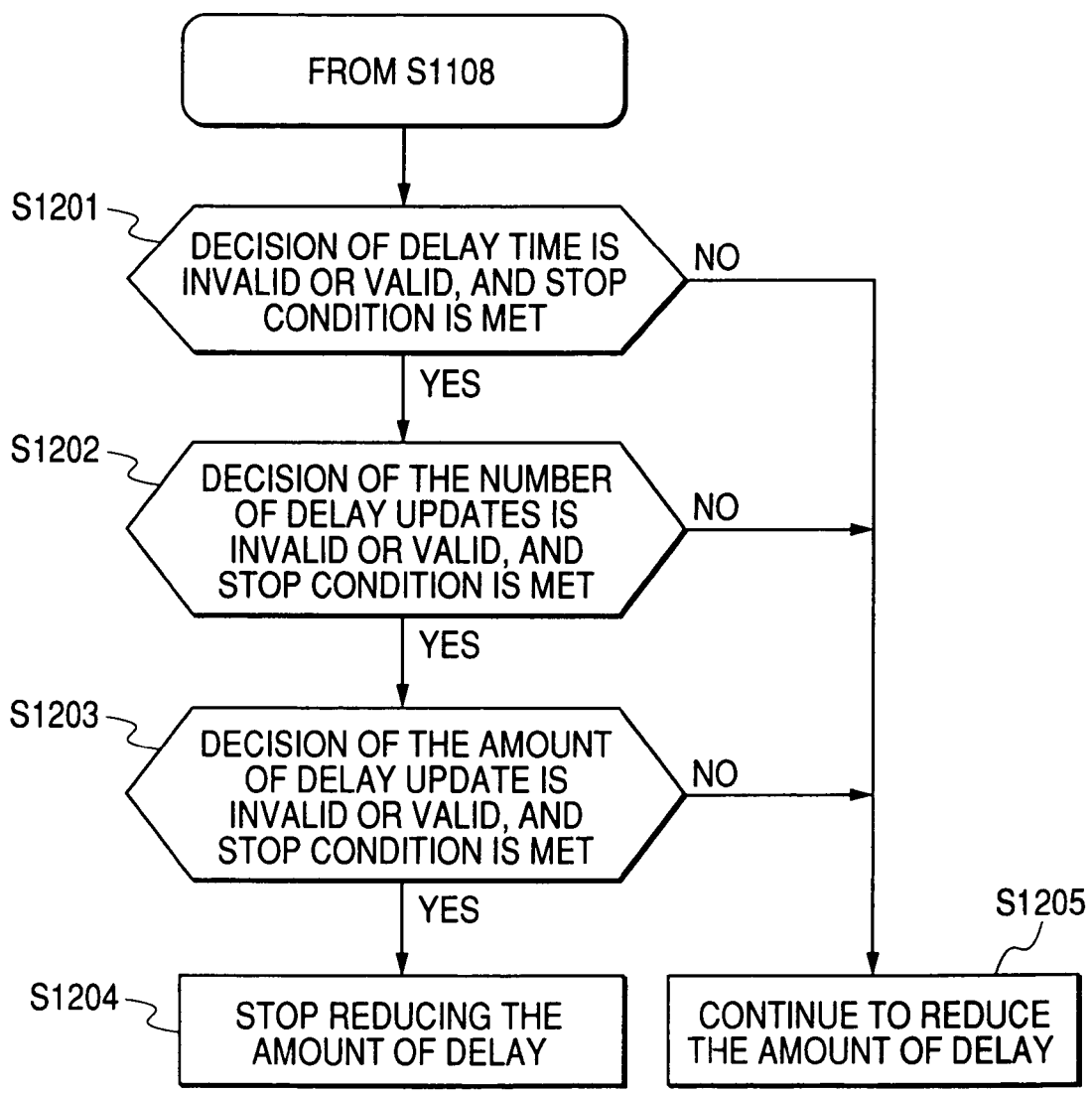
FIG. 12 is a diagram showing an example of a stop decision process of a process of reducing the amount of delay during the process of reducing the amount of delay.

FIG. 12 is a flowchart showing the stop decision process of the process of reducing the amount of delay.

When the process of reducing the amount of delay is being performed, the copy management program 221 of the primary storage system 120A decides by the valid flag 631 whether the decision of control of the amount of delay by the delay time difference is valid. Whether the decision is invalid or valid and the current delay time difference 461 meets the control stop condition 632 is decided (S1201). When it does not meet the condition, the process of reducing the amount of delay is continued based on the operation in control of the amount of delay 634 (S1205).

When meeting the condition by the delay time difference, the number of delay updates is decided in the same manner (S1202). The amount of delay update data is alike (S1203).

When meeting all stop conditions of the process of reducing the amount of delay for the delay time difference, the number of delay updates and the amount of delay update data, the flag 470 in which the process of reducing the amount of delay is being performed is allowed to be OFF to stop the process of reducing the amount of delay of remote copy (S1204).

Embodiment 2

A second embodiment according to the present invention will be described using FIG. 13.

Figure 13:
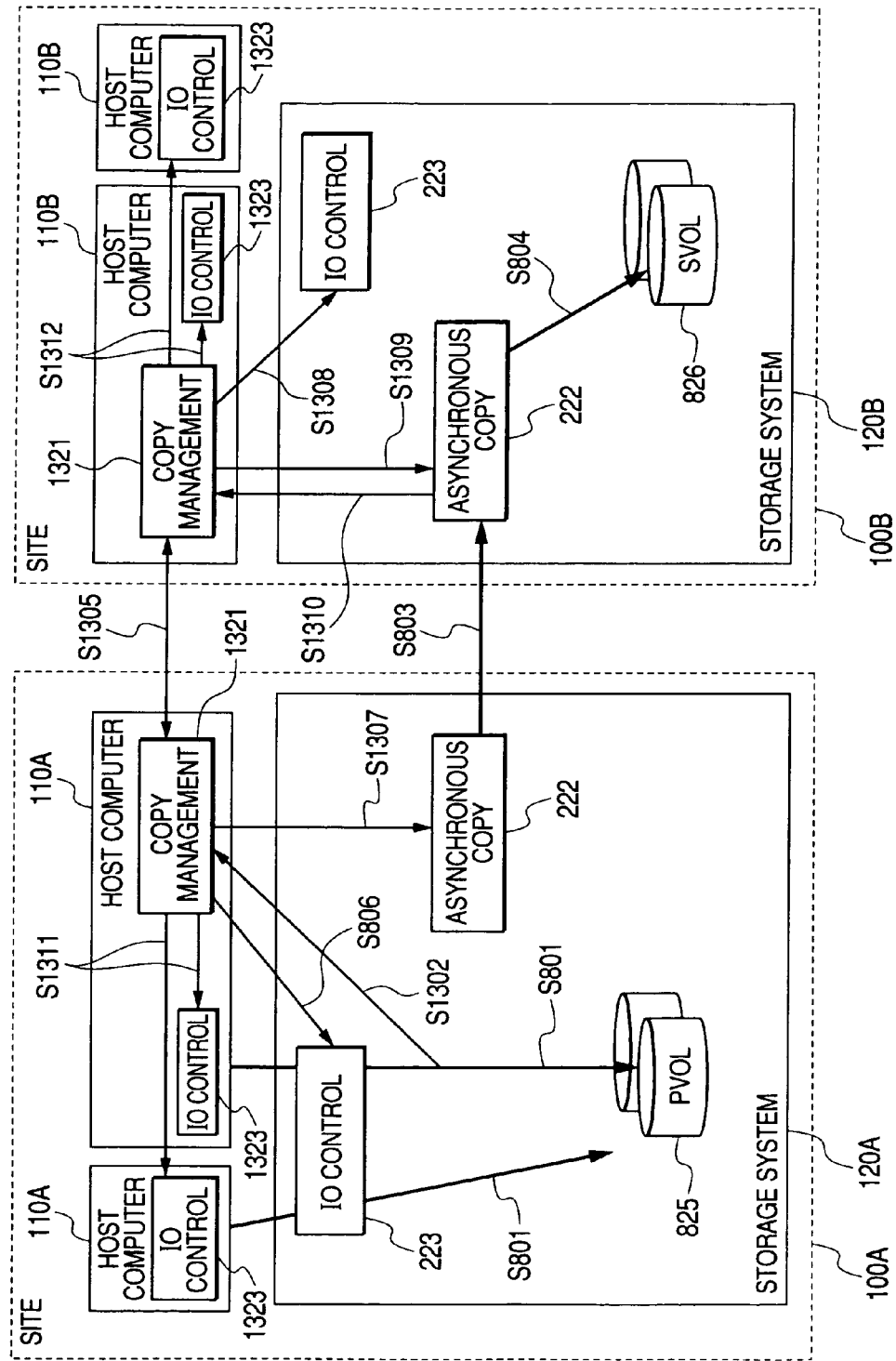
FIG. 13 is a diagram showing an example of a process of controlling the amount of delay of asynchronous remote copy according to a second embodiment of the present invention.

FIG. 13 is a diagram showing the operation of a process of controlling the amount of delay of asynchronous remote copy according to the second embodiment of the present invention.

A computer system of the second embodiment is different from the first embodiment in that as shown in FIG. 13, a copy management program 1321 is included in the host computer 110, not in the storage system 120, and that an IO control program 1323 is also included in the host computer 110. Each of the host computers has a communication line coupled to each other. The copy management program 1321 performs communication with the primary host computer 110A and the secondary host computer 110B. The copy management program 1321 and the IO control program of the primary host computers and the secondary host computers are communicated with each other.

In the primary site 100A, to update of data of the PVOL (S801), remote copy data is created by the primary storage system. The remote copy data information (the sequence number 510, the data 520, the address 530, and the time stamp 540) is transferred to the primary host computer 110A (S1302).

The primary host computer 110A updates the delay information based on the obtained remote copy data information. A specific process of updating delay information is similar to that of the first embodiment.

The asynchronous remote copy process (S803) from the primary storage system 120A to the secondary storage system 120B and the process of writing transferred remote copy write data in the secondary storage system 120B (S804) are similar to those of the first embodiment.

The asynchronous transfer program 222 of the primary storage system 120B transfers the state of the formalizing process (the formalized sequence number) to the secondary host computer 110B (S1310).

The copy management program 1321 of the primary host computer 110A and the copy management program 221 of the secondary host computer 110B exchange information on the copy state of remote copy (S1305). Specifically, the information exchanged is the latest sequence number of the remote copy write data which has been formalized by the secondary storage system 120B. The copy management program 221 of the primary host computer 110A updates the amount of delay of asynchronous remote copy from the information on the copy state of remote copy received from the secondary host computer 110B. When the amount of delay of asynchronous remote copy meets the configuration conditions, the process of reducing the amount of delay is started. The process of updating the amount of delay and the decision process of the process of reducing the amount of delay are similar to those of the first embodiment.

As the process of reducing the amount of delay, the copy management program of the primary host computer 110A gives an instruction to the primary IO control program 223 to delay a write request response from the primary host computer 110A (S1306), and gives an instruction to the asynchronous copy program to increase the priority of remote copy (S1307), and the copy management program 1321 of the primary host computer 110A gives an instruction via the copy management program 221 of the secondary host computer 110B to the secondary storage system to delay a response to an input/output request from the secondary host computer 110B (S1308), thereby reducing the load of the secondary storage system, increasing the priority of the process of formalizing the remote copy write data by the asynchronous copy program (S1309), and increasing the number of transfer lines of the remote copy. This is similar to the first embodiment. As another process of reducing the amount of delay, the copy management program of the primary host computer 110A gives an instruction to the IO control program 1323 of each of the primary host computers 110A to reduce write requests to the primary storage system (S1311), and gives an instruction to the IO control program 1323 of each of the secondary host computers 110B via the copy management program of the secondary host computer 110B to reduce input/output requests to the secondary storage system, reducing the load of the secondary storage system (S1312).

(The features of the computer system and the asynchronous remote copy method of the computer system of the present invention according to the above embodiments)

The computer system and the asynchronous remote copy method of the computer system of the present invention, which are described above, asynchronous remote copy is performed by the storage system, the amount of delay of the asynchronous remote copy is managed by the storage system or the host computer, and the process of reducing the amount of delay is performed by the storage system and the host computer when the amount of delay of the asynchronous remote copy is increased. When the amount of delay of the asynchronous remote copy exceeds the configuration value, the operation reducing the amount of delay is started so that the amount of data of the primary site lost in disaster can be within a certain configuration value.

What is claimed is:

1. A remote copy system comprising:
   a primary site having a first storage system coupled to a host computer; and
   a secondary site having a second storage system,
   wherein said first storage system is coupled to said second storage system via a communication line,
   wherein said first storage system receives a write request from said host computer, asynchronously transfers write data transferred according to said write request to said second storage system via said communication line, and writes said write data into a first storage area owned by said first storage system,
   wherein said second storage system writes the write data transferred from said first storage system into a second storage area owned by said second storage system, wherein said first storage system recognizes a size of differential data which is data written into said first storage area but not written into said second storage area, decides whether to start a process to reduce said size based on whether said size is larger than a threshold, and stops said process based on said size having been reduced, after said process is started, and wherein said process includes limiting input of write requests from said host computer to said first storage system.

2. The remote copy system according to claim 1, wherein said first storage system recognizes an amount of delay of data write between said first storage system and said second storage system based on obtained information, wherein said amount of delay is a difference in data write times between a data write at said first storage system and a data write at said second storage system, and wherein a process of reducing the amount of delay is executed when said amount of delay exceeds a predetermined threshold value.

3. The remote copy system according to claim 2, wherein said operation reducing the amount of delay is an operation in which said first storage system delays sending of a write completion report sent to said host computer.

4. The remote copy system according to claim 2, wherein said operation reducing the amount of delay is an operation increasing the priority of a data transfer process from said first storage system to said second storage system.

5. The remote copy system according to claim 2, wherein said operation reducing the amount of delay is an operation increasing the number of paths used for the data transfer process from said first storage system to said second storage system.

6. A remote copy system comprising:

a primary site having a first storage system coupled to a host computer; and a secondary site having a second storage system, wherein said first storage system is coupled to said second storage system via a communication line, wherein said first storage system receives a write request from said host computer, asynchronously transfers write data transferred according to said write request to said second storage system via said communication line, and writes said write data into a first storage area owned by said first storage system, wherein said second storage system writes the write data transferred from said first storage system into a second storage area owned by said second storage system, wherein said first storage system recognizes a size of differential data which is data written into said first storage area but not written into said second storage area resulting from a difference in the number of data writes between data writes at said first storage system and data writes at said second storage system, decides whether to start a process to reduce said size based on whether said size is larger than a threshold, and stops said process based on said size having been reduced, after said process is started, and wherein said process includes limiting input of write requests from said host computer to said first storage system.

7. The remote copy system according to claim 6, wherein said first storage system recognizes an amount of delay of data write between said first storage system and said second storage system based on obtained information, wherein said amount of delay is said difference in the number of data writes between data writes at said first storage system and data writes at said second storage system, and wherein a process of reducing the amount of delay is executed when said amount of delay exceeds a predetermined threshold value.

8. The remote copy system according to claim 7, wherein said operation reducing the amount of delay is an operation in which said first storage system delays sending of a write completion report sent to said host computer.

9. The remote copy system according to claim 7, wherein said operation reducing the amount of delay is an operation increasing the priority of a data transfer process from said first storage system to said second storage system.

10. The remote copy system according to claim 7, wherein said operation reducing the amount of delay is an operation increasing the number of paths used for the data transfer process from said first storage system to said second storage system.

11. A remote copy system comprising:

a primary site having a first storage system coupled to a host computer; and a secondary site having a second storage system, wherein said first storage system is coupled to said second storage system via a communication line, wherein said first storage system receives a write request from said host computer, asynchronously transfers write data transferred according to said write request to said second storage system via said communication line, and writes said write data into a first storage area owned by said first storage system, wherein said second storage system writes the write data transferred from said first storage system into a second storage area owned by said second storage system, wherein said first storage system recognizes a size of differential data which is data written into said first storage area but not written into said second storage area resulting from a difference in the number of data writes between data writes at said first storage system and data writes at said second storage system, decides whether to start a process to reduce said size based on whether said size is larger than a threshold, and stops said process based on said size having been reduced, after said process is started, wherein said size being larger than the threshold indicates that an amount of delay resulting from a difference in the number of data writes between data writes at said first storage system and data writes at said second storage system exceeds a predetermined threshold value, and wherein said process includes limiting input of write requests from said host computer to said first storage system.

12. The remote copy system according to claim 11, wherein said first storage system recognizes an amount of delay of data write between a data write at said first storage system and a data write at said second storage system based on obtained information, wherein a process of reducing the amount of delay is executed when said amount of delay exceeds a predetermined threshold value, and wherein said operation reducing the amount of delay is an operation in which said first storage system delays sending of a write completion report sent to said host computer.

13. The remote copy system according to claim 12, wherein said operation reducing the amount of delay is an operation increasing the priority of a data transfer process from said first storage system to said second storage system.

14. The remote copy system according to claim 12, wherein said operation reducing the amount of delay is an operation increasing the number of paths used for the data transfer process from said first storage system to said second storage system.

15. The remote copy system according to claim 12, wherein said amount of delay is a difference in an amount of data writes between said first storage system and said second storage system.

16. The remote copy system according to claim 2, wherein said difference in data write times is a difference between a time at which a data write is performed in the first storage system to store write data in the first storage system and a current time of a data write performed in the second storage system to update remote copy data stored in the second storage system based on the write data from the first storage system.

17. The remote copy system according to claim 7, wherein said difference in the number of data writes is a difference in the number of data writes performed in the first storage system to store write data in the first storage system and the number of data writes performed at the second storage to update remote copy data stored in the second storage system based on the write data during a period of time.

18. The remote copy system according to claim 15, wherein said difference in the amount of data writes is a sum of an amount of write data of data writes performed at the first storage system based on write requests from the host computer after a point in time at which remote copy data stored by the second storage system is updated by the first storage system.

19. The remote copy system according to claim 12, wherein said operation reducing the amount of delay is stopped when meeting a stop condition by the process of reducing the amount of delay.

\* \* \* \* \*